United States Patent [19]

Kaya et al.

[11] 4,303,982
[45] Dec. 1, 1981

[54] SYSTEM FOR THE MEASUREMENT AND CONTROL OF THE HEAT INPUT TO A GAS BURNER

[75] Inventors: Azmi Kaya, Akron; Marion A. Keyes, IV, Chagrin Falls; Michael P. Lukas, Eastlake, all of Ohio

[73] Assignee: The Babcock & Wilcox Company, New Orleans, La.

[21] Appl. No.: 65,020

[22] Filed: Aug. 9, 1979

[51] Int. Cl.³ .......................................... G01K 17/06
[52] U.S. Cl. .................................. 364/550; 364/558; 73/190 H; 73/193 R; 73/861.02
[58] Field of Search ............. 364/550, 558; 73/205 R, 73/205 D, 190 R, 190 H, 193 R, 194 M, 194 E, 861.01, 861.02, 861, 861.52; 318/610

[56] References Cited

U.S. PATENT DOCUMENTS

| | | | |
|---|---|---|---|
| 3,173,003 | 3/1965 | Girard | 73/205 D |
| 3,750,472 | 8/1973 | Ducousset | 73/205 D |
| 3,785,204 | 1/1974 | Lisi | 73/194 M |
| 3,834,617 | 9/1974 | Dyntar | 318/610 |
| 3,875,955 | 4/1975 | Gallatin et al. | 73/205 D |
| 3,934,471 | 1/1976 | White et al. | 73/205 D |
| 4,090,241 | 5/1978 | Houston | 73/194 M |
| 4,131,015 | 12/1978 | Chawla et al. | 73/205 D |
| 4,144,754 | 3/1979 | Pitts, Jr. et al. | 73/205 D |
| 4,161,119 | 7/1979 | Brandt, Jr. | 73/205 D |
| 4,244,216 | 1/1981 | Dukelow | 73/190 H |

*Primary Examiner*—Mark E. Nusbaum
*Assistant Examiner*—Gary Chin
*Attorney, Agent, or Firm*—Robert J. Edwards; John F. Luhrs

[57] ABSTRACT

A system for the measurement and control of the rate of BTU input to a gas burner wherein a signal is generated corresponding to the square root of the product of the burner inlet pressure multiplied by the in-situ density olf the gas, which, multiplied by a signal of constant value, corresponds to the mass flow of gas to the burner. This signal is then multiplied by a second signal of constant value to generate a signal corresponding to the rate of BTU input to the burner and which is compared with a set point signal to regulate the mass flow of gas to the burner as required to maintain the rate of BTU input to the burner at set point.

4 Claims, 1 Drawing Figure

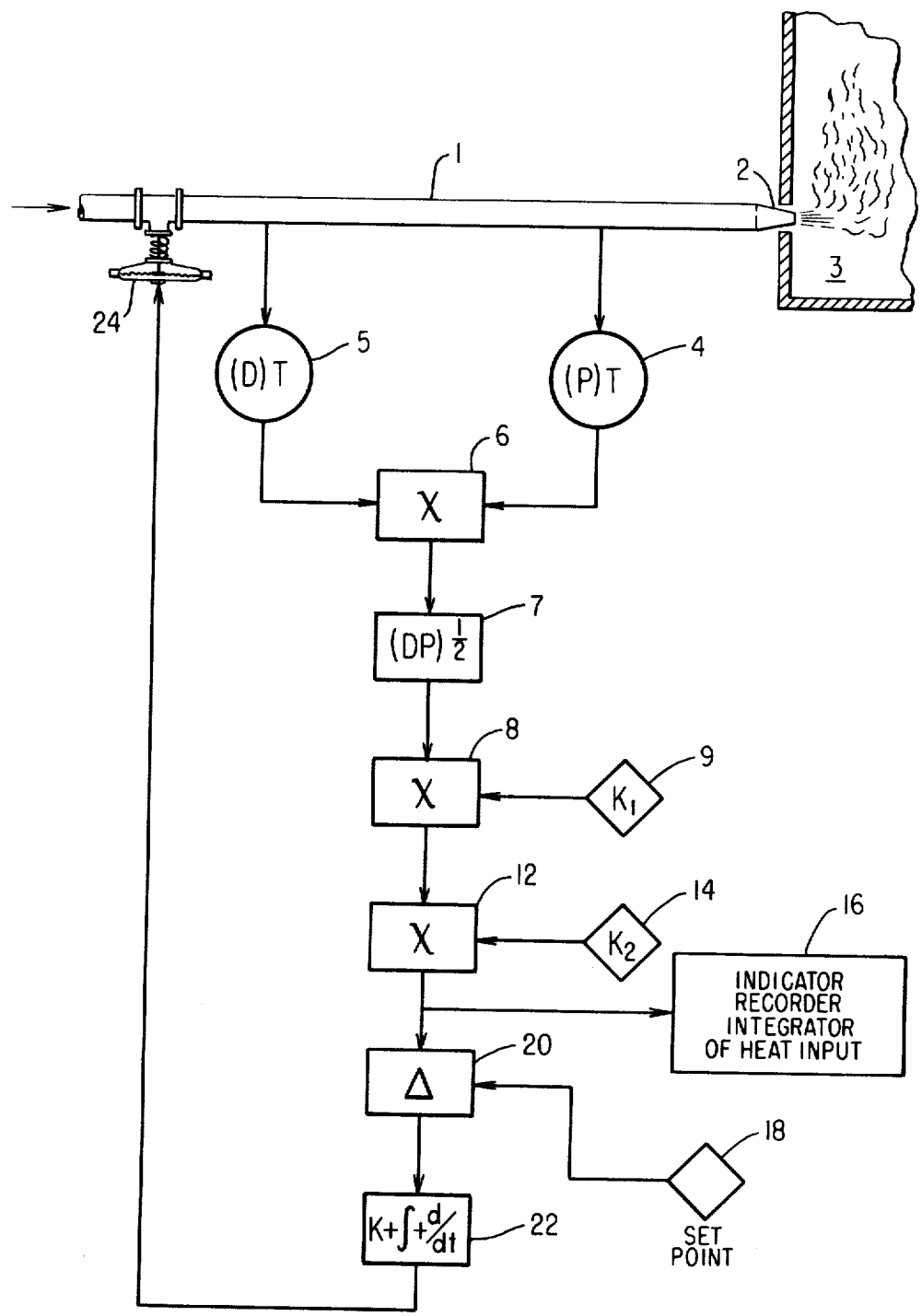

SYSTEM FOR THE MEASUREMENT AND CONTROL OF THE HEAT INPUT TO A GAS BURNER

This invention relates to a system for the measurement and control of the heat input to a gas burner.

As known, the mass rate of fluid flow through a pipe can be determined by means of the equation:

$$W = K_1(hD)^{\frac{1}{2}} \quad (1)$$

where:
W = Rate of flow in selected weight and time units.
$K_1$ = A constant
h = Differential across primary element installed in pipe.
D = Density of the flowing fluid.

In measuring the rate of fuel input to a burner discharging into a furnace at atmospheric pressure, the burner itself may constitute the primary element and the burner inlet pressure is then a measure of the differential pressure. For this special case equation (1) becomes:

$$W = K_1(PD)^{\frac{1}{2}} \quad (2)$$

where: P = Burner inlet pressure in PSIG

While the specific gravity or density of a gas supplied a burner may vary, it has been found that over the range in densities for which a particular burner is suitable the BTU per pound of gas is substantially constant. The rate of BTU input to a gas burner is therefore expressed by the equation:

$$H = K_1(PD)^{\frac{1}{2}}K_2 \quad (3)$$

where:
H = Rate of BTU input
$K_2$ = BTU per unit of weight of the gas

With the foregoing in mind, it is a principle object of the invention to provide a system of universal application for the measurement and control of the rate of BTU input to a gas burner.

It is a further object of this invention to provide such a system which can be contructed of pneumatic, or electronic analog or digital components.

It is a further object of this invention to provide such a system constructed of rugged and simple components suitable for use in industrial environments.

These and other objects will be apparent as the description proceeds in connection with the drawing in which:

In the drawing

The drawing is a logic diagram of a system embodying the principles of this invention.

DETAILED DESCRIPTION

In the drawing and in the following description conventional logic symbols have been used. It will be recognized that the components, or hardware, as it is sometimes called, which such symbols represent, are commercially available and their operation well understood by those familiar with the art. Further, conventional logic symbols have been used to avoid specific identification of this invention with any particular type of components such as analog or digital pneumatic, electric or electronic, as this invention comprehends any one or a combination of such types.

Illustrated in the drawing is a conduit 1 supplying fuel gas to a burner 2 discharging fuel into a furnace 3 at atmospheric pressure. The burner 2 having a fixed orifice area, the rate of fuel flow varies as the square root of the pressure differential across the burner. As the fuel is discharged into the furnace 3 at atmospheric pressure, the burner inlet gauge pressure can be taken as a measure of this differential pressure.

A signal corresponding to burner inlet gauge pressure is generated in a transmitter 4. A signal corresponding to the flowing or in-situ density of the fuel is generated in a transmitter 5. These two signals input to a multiplying unit 6 generating an output signal corresponding to the product of density multiplied by burner inlet gauge pressure, which output signal inputs to a function generator 7, generating an output signal corresponding to the square root of the product of density multiplied by burner inlet gauge pressure. The output signal from the function generator 7 is then multiplied in a multiplier unit 8 by signal corresponding to the constant $K_1$ generated in a manually adjustable unit 9 to produce a signal corresponding to the mass rate of flow of fuel to the burner 2.

The output signal from multiplier unit 8 inputs to a multiplier unit 12 generating a corresponding output signal multiplied by a signal generated in a unit 14, corresponding to the BTU per unit of weight of the gas flowing to the burner 2. As previously discussed, the BTU per pound of gas is a constant and hence $K_2$ is a constant, regardless of changes in density. A readout device responsive to the output signal from unit 12, such as shown in 16, exhibits the rate and the total over a selected period of time of the BTU input to the burner 2.

Through suitable control instrumentalities the rate of BTU input to the burner can be maintained at a desired set point as established either automatically or manually. By way of illustration a signal generator 18 is shown which generates a signal corresponding to the desired rate of BTU input, which in a difference unit 20 is compared with the output signal from multiplier unit 12. The output signal from the difference unit 20, corresponding in sense and magnitude to the difference between the desired and actual rate of BTU input to the burner 2, is transmitted to a control unit 22 which generates an output signal varying in desired functional relationship with the input signal (proportional, integral and derivative, as required). A final control element 24, such as a valve or damper, receives the signal from control unit 22 and serves to vary the rate of flow of fuel to the burner 2 as required to maintain the actual rate of BTU flow to the burner equal to the desired rate.

We claim:

1. In a system for the measurement of the rate of BTU input to a gas burner discharging into a furnace at atmospheric pressure, comprising, means generating a first signal proportional to burner inlet gauge pressure, means generating a second signal proportional to the in-situ density of the gas at the burner inlet and means responsive to the first and second signals generating a third signal proportional to the square root of the product of the first signal multiplied by the second signal which represents the weight rate of gas flow to the burner, means generating a constant value signal proportional to the BTU per pound of the gas and means responsive to said third and constant value signals generating a fourth signal proportional to the product of said third and constant value signals which represents the rate of BTU input to the burner.

2. In a system as set forth in claim 1 further including readout means responsive to said fourth signal exhibiting the rate of BTU input to said burner.

3. In a system as set forth in claim 1 further including means generating a fifth signal proportional to the set point BTU input to the burner, a difference unit responsive to said fourth and fifth signals generating a sixth signal proportional to the difference between said fourth and fifth signals and means under the control of said sixth signal regulating the weight flow of gas to the burner to maintain the BTU input to the burner at set point.

4. In a system as set forth in claim 3 wherein said last named means comprises a proportional plus integral plus derivative controller responsive to said sixth signal generating a seventh signal to regulate the weight flow of gas to the burner.

* * * * *